Figure 1:
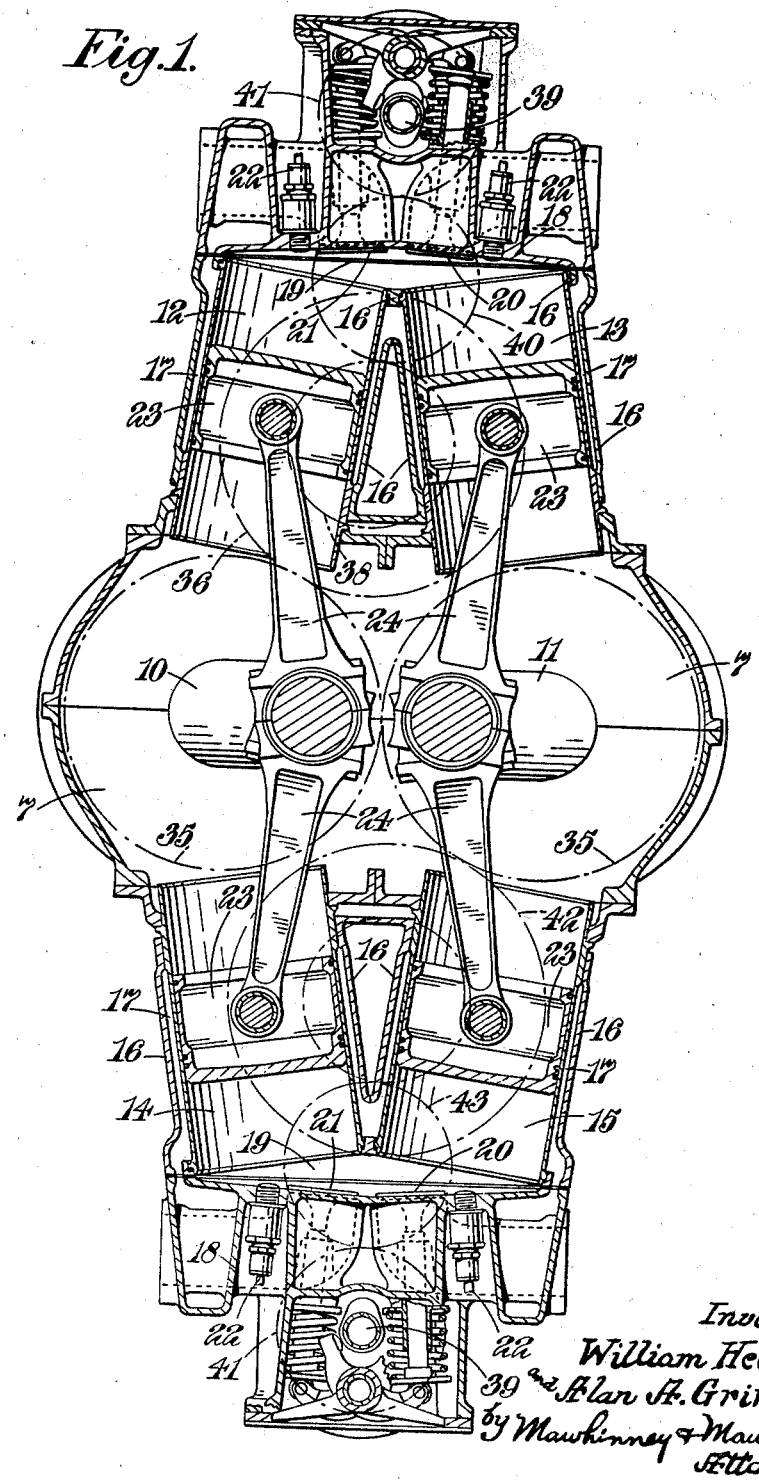

Nov. 22, 1938.   W. HELMORE ET AL   2,137,941
INTERNAL COMBUSTION ENGINE
Filed April 2, 1937   6 Sheets-Sheet 1

Inventors
William Helmore
and Alan A. Griffith
by Mawhinney & Mawhinney
Attorneys.

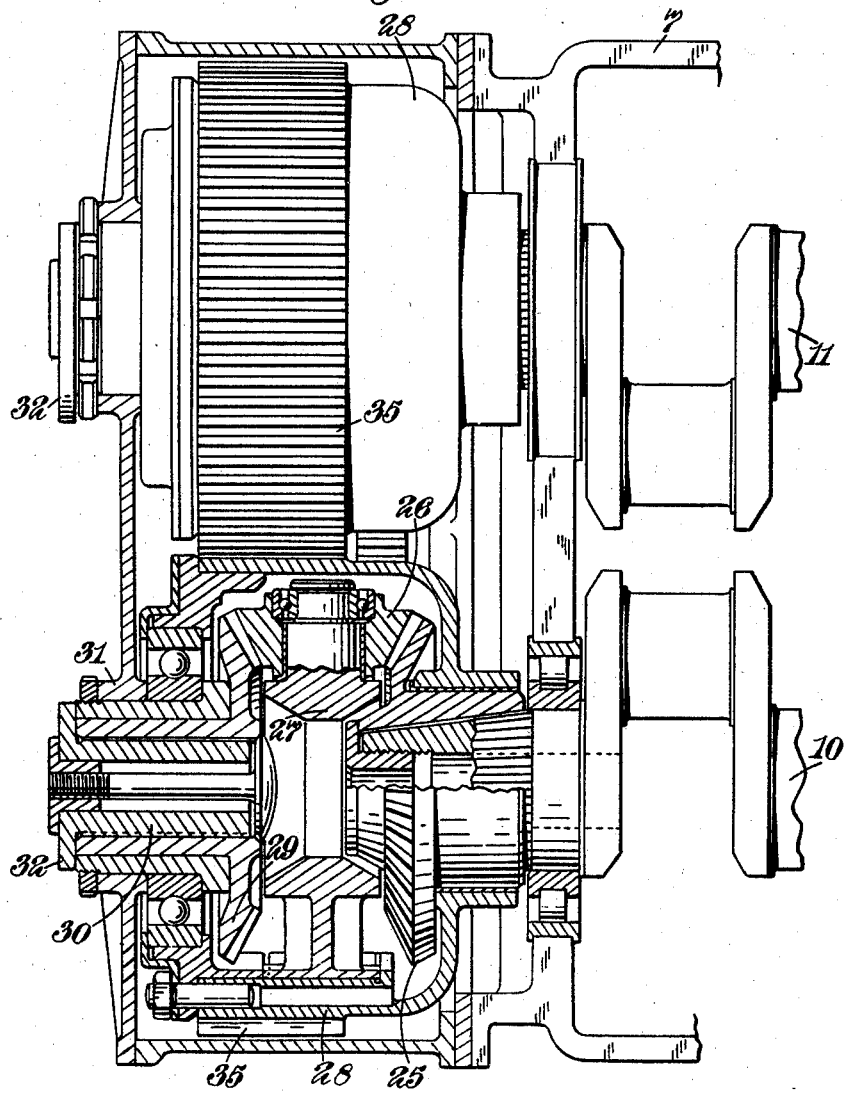

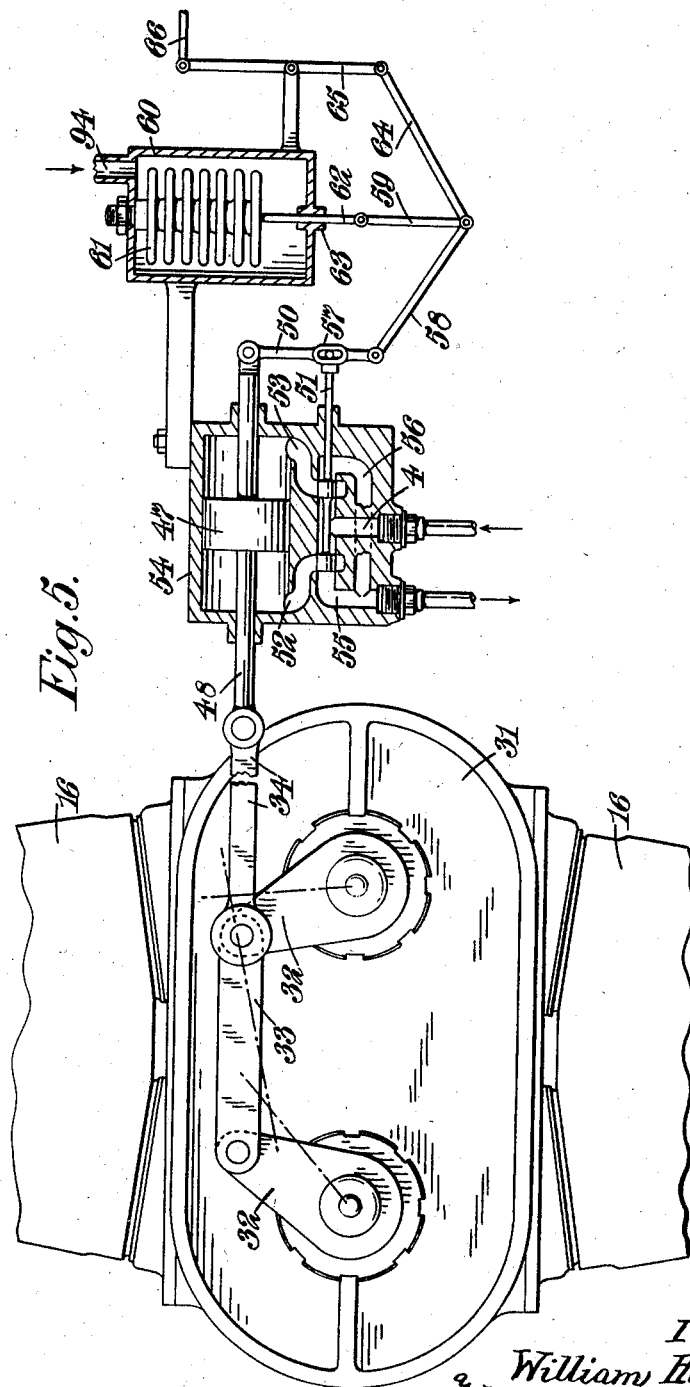

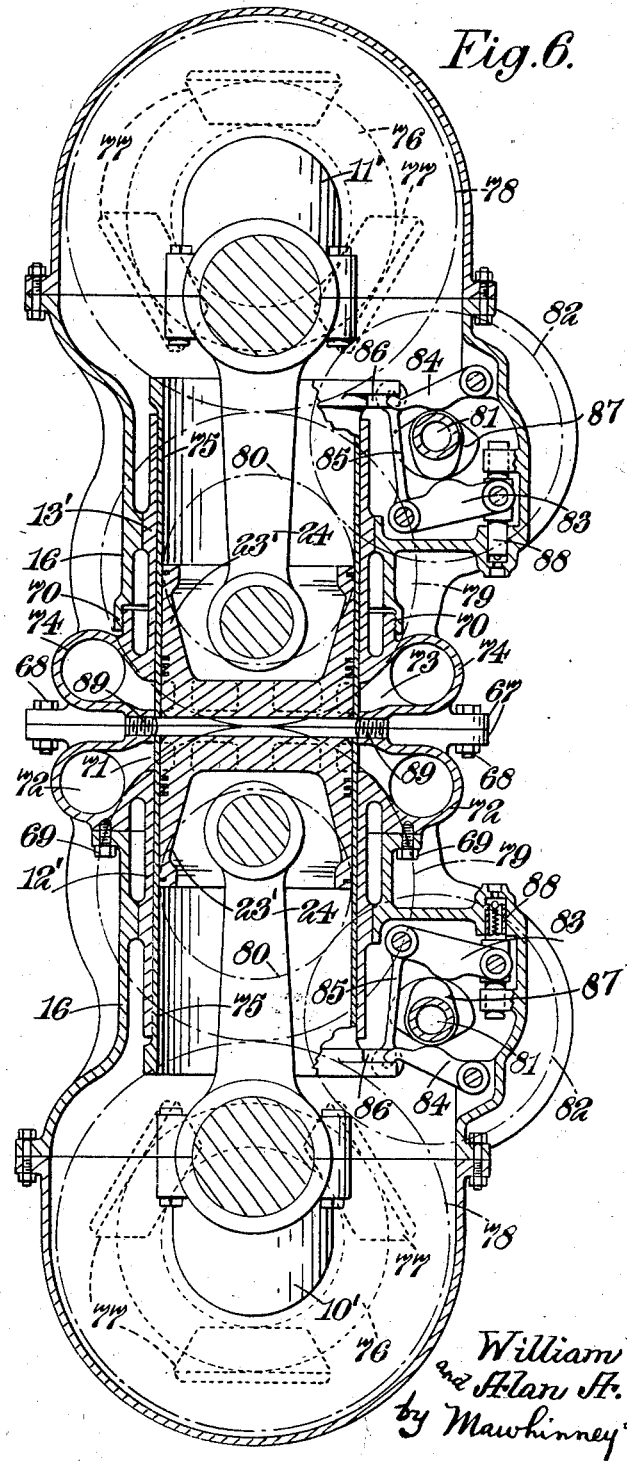

Patented Nov. 22, 1938

2,137,941

UNITED STATES PATENT OFFICE 2,137,941

INTERNAL COMBUSTION ENGINE

William Helmore, Cambridge, and Alan Arnold Griffith, South Farnborough, England Application April 2, 1937, Serial No. 134,608
In Great Britain April 8, 1936

23 Claims. (Cl. 123—51)

This invention relates to improvements in internal-combustion engines of the kind provided with means for varying the compression ratio and is particularly applicable to engines for use in aircraft.

According to this invention, a variable-compression internal-combustion engine comprises two driving shafts geared together to rotate the same number of revolutions per minute, one or more pairs of cylinders of equal diameter, each pair having a combustion chamber common to both cylinders and containing pistons reciprocated respectively by the two driving shafts and means for adjusting the angular relationship of the two driving shafts in respect to one another during the running of the engine, whereby the compression ratio may be altered. The term "driving shaft" is intended to include the crankshaft or, in the case of a swash-type engine, a shaft on which the swash member is mounted.

Heretofore, the mechanism provided for varying the compression ratio has necessitated the employment of excessive force in order to effect and maintain a change of compression during the running of the engine. Thus, the mechanism for effecting a change of compression ratio was unduly heavy, rendering it objectionable for use in aircraft.

As indicated above, according to the present invention, means are provided for adjusting the angular relationship of the two driving shafts. This necessarily involves movement of an adjusting member which is subjected to the torque reactions of the two driving shafts. It will be appreciated that if the torque reactions operate on that member in the same direction, a force equal to the combined reactions will be required to maintain the member in any one position, and a still greater force will be required to move it against the reactions. Theoretically, during one cycle of the engine, the torques in the driving shafts, and thus the torque reactions, will vary both in magnitude and direction but owing to such factors as inertia and elasticity of the moving parts, the torque reactions on said member may be regarded as being equal to the mean torques developed during a cycle. In order to minimize the force required to move or to maintain the adjusting member in any one position, the mean torque reactions may be made to operate upon that member in opposite directions. It might be thought that by so opposing the mean torque reactions little or no resultant reaction would be applied to the adjusting member. It is a characteristic, however, of the engine of the present invention that as the driving shafts are brought out-of-phase the mean torques of the two driving shafts become increasingly different. This can be illustrated by the fact that during the explosion-stroke one piston may be ascending while the other is descending. In order to compensate for this difference in mean torque, adjustable means are provided to balance the difference between the two torque reactions, for example by varying the effect of the torque reactions on said member so that the effective torque reactions of both crank-shafts on said member are as nearly as possible equal.

The following is a description of two forms of engine according to this invention, reference being made to the accompanying drawings, in which:—

Figure 2:
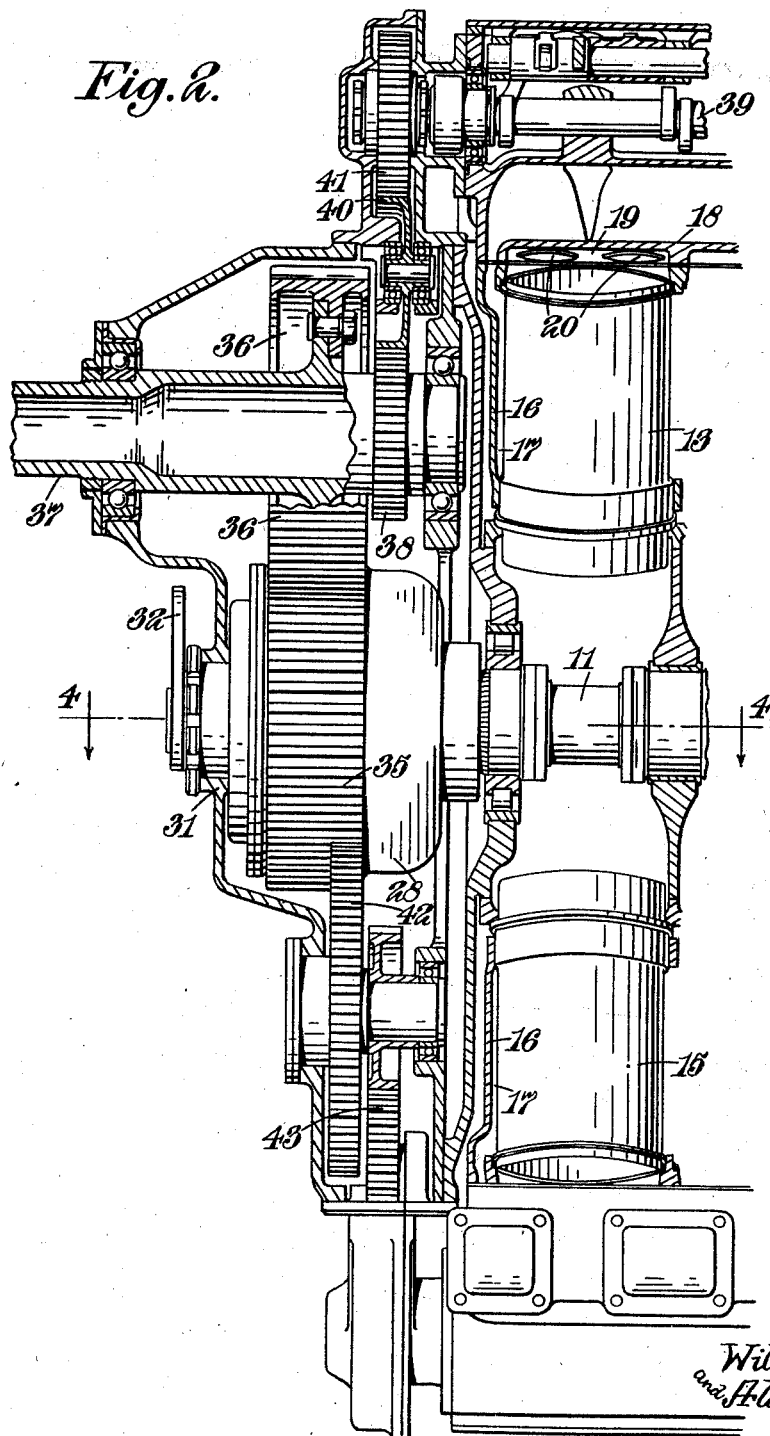
Figure 3:
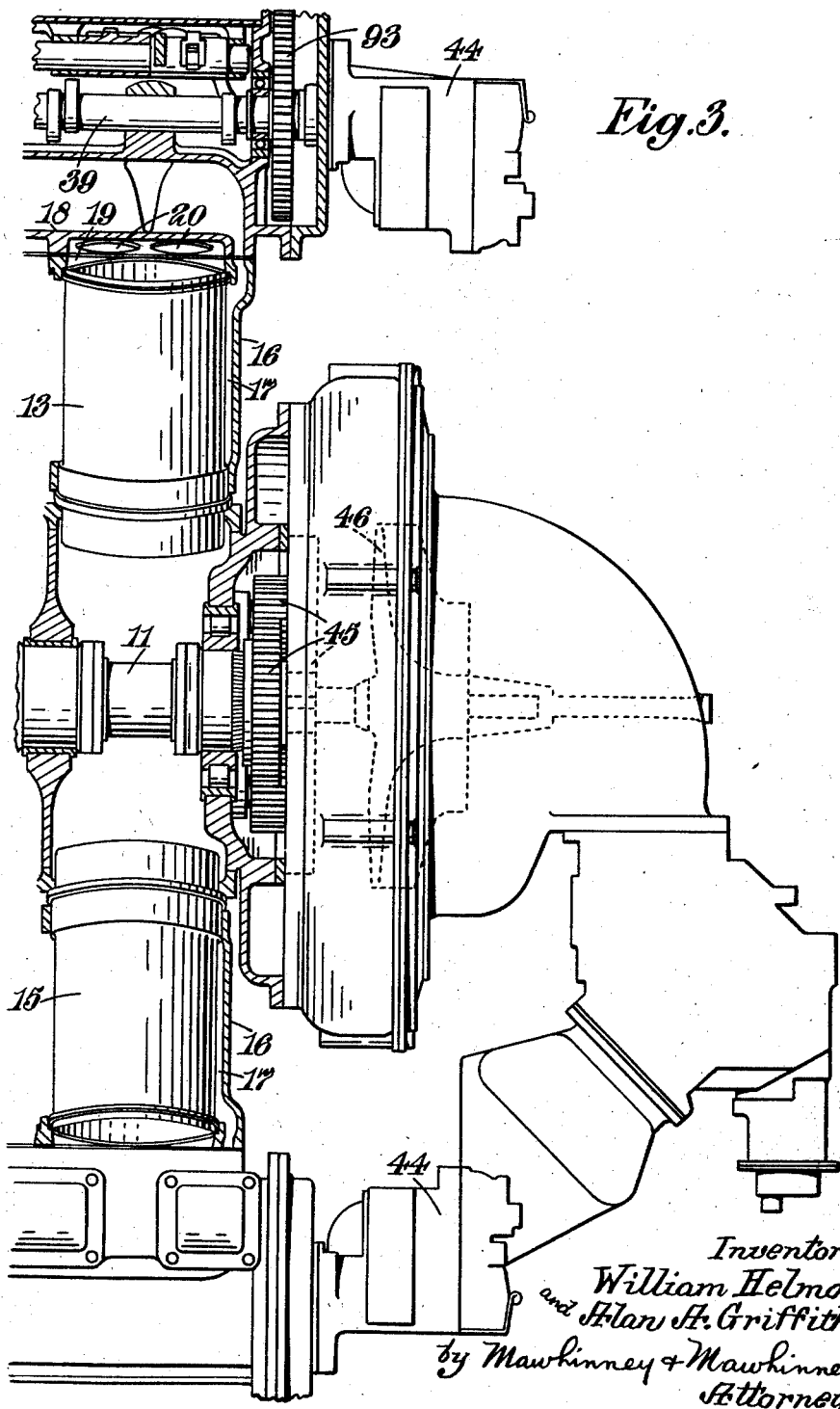

Figure 1 is a vertical cross-section through an engine having two crank-shafts arranged side-by-side and a number of pairs of cylinders disposed above and below the crank-shafts, Figures 2 and 3 are vertical longitudinal sections showing the two ends of the engine, Figure 4, which is drawn on a larger scale than the previous figures, is a horizontal cross-section on the line 4—4 of Figure 2, showing one differential gear in section and the other in elevation, Figure 5 is an end elevation of a portion of the forward part of the engine, showing diagrammatically the operating connection between the two differential gears and the mechanism for effecting adjustment of the differential gears, and Figure 6 is a diagrammatic vertical longitudinal section through an engine having a number of pairs of cylinders, the two cylinders in each pair being arranged end-to-end.

According to the construction shown in Figures 1 to 5, two crank-shafts 10 and 11 are arranged side-by-side parallel with on another, and a number of pairs of cylinders 12 and 13 are arranged above the crank-shafts and a similar number of pairs of cylinders 14 and 15 are arranged beneath the crank-shafts. It will be noted that the axes of the two cylinders in each pair are inclined towards one another as they extend away from the crank-shaft. A convenient angle for the inclination of the engine illustrated is about 20°; the said inclined axes are arranged to cut respectively the axes of the two crank-shafts. The cylinders, as is known, may comprise steel liners mounted in an outer casing 16 which provides a water-jacket-space 17 between it and the liner. In the engine illustrated six pairs of cylinders are arranged on each side of the two crank-shafts and the casing 16 housing the cylinders is bolted to a two-part crank-case 7. The cylinder-head 18 which extends along the length of the engine over the six pairs of cylinders is so shaped as to provide one combustion chamber 19 for each pair of cylinders. The two cylinders of each pair are controlled by the same set of valves comprising two inlet valves 20 arranged side-by-side along the length of the engine and two exhaust valves 21. Dual ignition may be provided by two sparking-plugs 22. Mounted in each cylinder is a piston 23 connected by a connecting-rod 24 to its respective crank-shaft. Each crank-shaft is arranged to drive a differential gear which gears are shown in Figure 4. Fixed to the end of each crank-shaft is a sun-wheel 25 which is arranged in gear with a number of planet-wheels 26 rotatably mounted on a carrier 27 secured to a drum 28. A second sun-wheel 29 is also arranged to gear with the planet-wheel 26, which sun-wheel is secured to a hollow shaft 30 extending out through a casing 31 that encloses both differential gears. Secured to the outer extremity of each of the sun-wheel-shafts 30 is a control-lever-arm 32 and, as will be seen from Figure 5, the two control-lever-arms 32 are pivotally connected together by a link 33. Also pivotally connected to one of the lever arms 32 is an adjusting member 34. Both of the planet drums 28 are provided with an external gear-track 35. These two gear-tracks are arranged to engage with one another. As will be seen from Figure 2, one of the gear-tracks 35 engages a pinion 36 fixed to a power-shaft 37 which may comprise the propeller-shaft or may be gear-connected to the propeller-shaft. Fixed also to the power shaft 37 is a gear-wheel 38 which drives the cam-shaft 39 for the valve-gear through an intermediate pinion 40 and a gear-wheel 41 connected with said cam-shaft. One of the gear-tracks 35 is arranged to drive a compound pinion 42, the smaller gear of which compound wheel is arranged to drive an intermediate pinion 43 which engages a gear-wheel similar to 41 attached to the other cam-shaft 39.

As will be seen from Figure 3, each cam-shaft 39 is connected through gearing 43 with a magneto 44. In a case where dual ignition is required each cam-shaft may drive two magnetos. The crank-shaft 11 is connected through gearing 35 with an impeller 46 of a blower which is provided with suitable outlets for connection with the induction ports of the cylinders. The carburettor is connected to the intake of the blower.

As indicated earlier, the axes of the pair of cylinders are inclined towards one another and this necessitates the two crank-shafts being driven in opposite directions in order that the required phase relationship of the movements of the two pistons may be obtained.

It will be appreciated that the angular relationship between the two crank-shafts may be varied by rotating the two sun-wheels 29. As will be seen from Figure 5, the movement of the operating-rod will cause both sun-wheels 29 to be rotated in the same direction. Assuming the engine is stationary, rotation of the sun-wheels 29 will impart rotation to the planet-wheels about their axes and this will cause the crank-shafts 10 and 11 also to be rotated in the same direction. Since, however, in operation of the engine, the two crank-shafts rotate in oposite directions, one of them will be retarded in relation to the valve-timing and ignition, and the other will be advanced. In the setting shown in Figure 1, the two pistons are in phase, that is to say, they move up-and-down together and for this setting the compression ratio is a maximum. As soon as the crank-shafts are brought out of phase there will be a period during each cycle when one piston is rising while the other is falling, thus reducing the effective swept volume and compression ratio. Should it be possible to bring the crank-shafts 180° out-of-phase (which it is not) the pistons would always be moving in opposite directions and the effective swept volume and compression ratio would be nil. It will be appreciated that so long as the crank-shafts are in phase, the mean torque reactions on the sun-wheels 29 will be equal and opposite and thus very little force will be required to be transmitted by the adjusting member 34 to rotate them. When, however, the crank-shafts are brought out of phase, the mean torque reactions on the sun-wheels 29, as already explained, will not be balanced. This out-of-balance of mean torque reactions, however, may be compensated by selecting an appropriate length for the link 33 between the two lever-arms 32. For example, it will be seen from Figure 5 that when the lever-arms are in a position indicated by the full lines which correspond to the in-phase relationship of the crank-shaft, the angles between the link 33 and the two lever-arms are the same and greater than a right-angle. In this position, as already indicated above, the two torque reactions are equal and balance one another and the turning effort provided by the operating-member 34 will be the same on each lever-arm. When, however, the lever-arms are in the positon shown in the dotted lines in Figure 5, the angle between the link 33 and the left-hand lever-arm 32 is greater than the angle between the link and the other lever-arm. Thus, although the torque reaction on one sun-wheel may be greater than on the other, the resultant forces transmitted to the adjusting member 34 may still be equal and opposite.

As already indicated earlier in the specification, the phase-changing mechanism for the two crank-shafts may be automatically operated by changes in pressure in the induction system. One form of such a control is diagrammatically shown in Figure 5. In this arrangement, the piston 47 of a servo-motor energized by the engine oil-pressure system is connected on one side by a rod 48 to the adjusting member 34 and on the other side is connected by a link 50 to a slide valve 51. The slide valve controls ports 52 and 53 at opposite ends of the cylinder 54 in which the piston 47 is mounted in such a manner that the aforesaid ports 52 or 53 may either be connected to a source of oil-pressure through the passage 4 or to the oil sump of the engine through the passages 55, 56. The link 50 is connected to the slide-valve through a pin-and-slot connection 57 which is located intermediate of the length of the link. The link is also connected through other links 58 and 59 to a pressure-responsive device communicating with the induction system. The said pressure or detonation-responsive device comprises an airtight chamber 60 in which is mounted an airtight bellows 61 fixed at one end to the casing 60 and having secured to the other end a rod 62 pivotally connected to the link 59 and extending out through a gland 63 in the casing. The casing communicates through a suitable conduit 94 with the induction system. The pivot between the links 58 and 59 is connected by links 64 and 65 to a rod 66 connected to the carburetter mixture control. Assuming there is an increase of pressure in the induction system without movement of the carburetter mixture control the bellows 61 will contract, causing the lower end of the link 50 to be swung to the left, because the pivot axis between 64 and 65 is fixed and thus the flexing between 58 and 64 will cause the left-hand end of link 58 to move to the left and to carry with it the lower end of the link 50. The pin-and-slot connection between 50 and 51 will cause the arcuate motion of 50 to be translated into rectilineal movement of 51. This will cause the slide valve to open the left-hand of the cylinder to oil-pressure and the right-hand to the oil pump of the engine. The piston 47 will thus move to the right until its movement causes the link 50 again to close the valve. The movement of the piston and rod 48 to the right is arranged to rotate the two sun-wheels 29 in such a direction as to decrease the compression ratio. Similarly, if the rod 66 is moved to the right, with an increase of throttle opening, the pistons 47, 48 will be moved to the right and the compression ratio will be decreased. It will be appreciated that with this arrangement, when used with an aeroplane engine, the compression ratio will require to be at its lowest at ground level.

When the aeroplane ascends, for example at full throttle, the pressure in the induction system will gradually fall off and thus there will be a tendency for reduction in power. This, however, is to some extent compensated by the compression ratio then being automatically increased by reason of the fact that the bellows 61 tend to expand, thus moving the slide valve to the left and causing the piston 47 and rod 48 also to move to the left, whereby the phase relationship of the crank-shafts is altered. Similarly, upon descending, the pressure in the induction system will increase whereby the compression ratio will be decreased thereby preventing detonation and excessive maximum pressure. At the same time the effective swept volume will be decreased thereby preventing excessive power being developed due to the additional charge introduced into the increased combustion space. The compression ratio may be varied from between 8:1 and 4:5 by varying the phase relationship of the two crank-shafts from in-phase to about 60° out-of-phase.

In the arrangement shown in Figure 6, the two cylinders 12' and 13' in each pair are arranged end to end and the two crank-shafts 10' and 11' are arranged at opposite ends of the assemblage. The adjacent ends of the cylinders are provided with flanges 67 which are secured together by bolts 68. The flanged ends of the cylinders may either be bolted to the outer casing 16, as indicated at 69, or the attachment may be provided by a screw-threaded engagement, as indicated at 70. One of the flanged portions 67 may be provided with a number of inlet passages 71 communicating with an inlet manifold 72 and with the interior of the cylinder, while the other flanged portion is provided with a number of exhaust passages 73 communicating with an exhaust manifold 74. Interposed between each piston 23' and surrounding cylinder is a valve sleeve 75. As will be seen, one sleeve controls the inlet passages 71 and the other sleeve controls the exhaust passages 73.

Each crank-shaft has secured to it a bevel sun-wheel 76 which engages a number of bevel planet-wheels 77, the carrier for which (not shown) is provided with a gear-wheel 78. Each gear-wheel 78 meshes with an intermediate gear-wheel 79 and the two intermediate gear-wheels mesh with one another. The two crank-shafts are arranged to rotate in opposite directions. A second bevel sun-wheel is arranged to engage (not shown) each set of planet-wheels and, as in the previous construction, the shafts of these two sun-wheels are provided with lever-arms which are connected together by a link to a control mechanism, whereby the rotation of the two sun-wheels alters the phase relationship of the two crank-shafts. Each of the intermediate gear-wheels 79 is provided with a compound wheel 80 which drives a cam-shaft 81 by engaging with a pinion 82. Opposite each cylinder the cam-shaft is straddled by two cam-followers 83 and 84. The cam-follower 83 is pivotally connected by a link 85 to a flange 86 formed at the outer end of the valve sleeve. The other cam-follower 84 engages the inner face of said flange. Thus, the sleeve is moved by a push-pull action resulting from the operation of the cam 87 on the two cam-followers. The pivotal mounting for the cam-follower 84 is fixed, whereas the mounting of the cam-follower 83 is movable and is urged towards the cam-shaft by a plunger 88 under the influence of the oil-pressure system of the engine.

The above design is suitable for a Diesel engine in which case a fuel injector may be accommodated in a threaded hole 89 formed between the two flanges 67. The compression ratio may be varied between 9:1 and 15:1 by varying the phase relationship of the two crank-shafts from in-phase to 47° out-of-phase.

We claim:—

1. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, adjustable gearing so arranged between said driving shafts that they rotate the same number of revolutions per minute and comprising an adjusting member the movement of which varies the angular relationship of said shafts in respect to another, which adjusting member is arranged that the torque reactions transmitted to it by the driving shafts are in opposite directions and adjustable means arranged to balance the difference between the torque reactions on said member (which difference varies with different angular relationships of said shafts).

2. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, adjustable gearing so arranged between said driving shafts that they rotate the same number of revolutions per minute and comprising an adjusting member the movement of which varies the angular relationship of said shafts in respect to one another, which adjusting member is arranged that the torque reactions transmitted to it by the driving shaft are in opposite directions and adjustable means interconnected with said adjusting member and arranged automatically to balance the difference between the torque reactions on said member (which difference varies with different angular relationships of said shafts).

3. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, an epicyclic gear so arranged to connect together the driving shafts that they are rotated the same number of revolutions per minute and means for adjustably rotating the reaction member of the epicyclic gear so as to vary the angular relationship of said driving shafts.

4. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, two epicyclic gears, one driven by each driving shaft, and gear-connected together so that said driving shafts rotate the same number of revolutions per minute and each provided with a reaction member and means for adjustably rotating the reaction members of said epicyclic gears, whereby the angular relationship of the driving shafts is altered.

5. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, two epicyclic gears, one driven by each driving shaft, and gear-connected together so that said driving shafts rotate the same number of revolutions per minute and each provided with a reaction member, and adjusting member interconnected with the reaction members of said epicyclic gears so that both said reaction members may be adjustably rotated and thereby alter the angular relationship of the two driving shafts.

6. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, two epicyclic gears, one driven by each driving shaft, and gear-connected together so that said driving shafts rotate the same number of revolutions per minute and each provided with a reaction member, an adjusting member so interconnected with the reaction members of said epicyclic gears that the torque reactions imparted to it from the two driving shafts are in opposite directions and so that both said reaction members may be adjustably rotated and thereby alter the angular relationship of the two driving shafts.

7. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, two epicyclic gears, one driven by each driving shaft, and gear-connected together so that said driving shafts rotate the same number of revolutions per minute and each provided with a reaction member having a crank arm attached thereto and a link connecting said crank arms, which epicyclic gears are arranged to impart to said link torque reactions in the opposite direction.

8. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, two epicyclic gears, one driven by each driving shaft, and gear-connected together so that said driving shafts rotate the same number of revolutions per minute and each provided with a reaction member having a crank arm attached thereto and a link connecting said crank arms, which epicyclic gears are arranged to impart to said link torque reactions in the opposite direction and the length and angular disposition of which crank arms and link are so selected that upon movement of the link the mechanical advantages of the crank-arms on the link vary in a manner to balance the changing difference between the torque reactions transmitted by the reaction members.

9. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, two epicyclic gears each comprising planet-wheels which engage both a gear-wheel on a driving shaft and a reaction gear-wheel and each comprising a planet-wheel carrier, which planet-wheel carriers are gear-connected together, and an adjusting member interconnected with the reaction gear-wheels so that both reaction gear-wheels may be adjustably rotated and thereby alter the angular relationship of the driving shafts.

10. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, two epicyclic gears each comprising planet-wheels which engage both a gear-wheel on a driving shaft and a reaction gear-wheel and each comprising a planet-wheel carrier, which planet-wheel carriers are gear-connected together and which gearing as a whole is so arranged that the driving shafts rotate the same number of revolutions per minute in opposite directions and an adjusting member so interconnected with the reaction gear-wheels that the torque reactions imparted to it from the two driving shafts are in opposite directions and so that by movement of the adjusting member both said reaction gear-wheels may be adjustably rotated and thereby alter the angular relationship of the two driving shafts.

11. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, two epicyclic gears each comprising planet-wheels which engage both a gear-wheel on a driving shaft and a reaction gear-wheel and each comprising a planet-wheel carrier, which planet-wheel carriers are gear-connected together and which gearing as a whole is so arranged that the driving shafts rotate the same number of revolutions per minute in opposite directions, a crank arm attached to each reaction gear-wheel, a link pivotally connecting together the two crank arms, the length and angular disposition of which crank arms and link are so selected that upon movement of the link the mechanical advantages of the crank arms on the link vary in a manner to balance the changing difference between the torque reactions transmitted by the reaction gear-wheels.

12. A variable-compression internal-combustion engine comprising two driving shafts arranged side-by-side and parallel with one another, a plurality of pairs of cylinders of equal diameter arranged in two rows on both sides of a plane containing the two driving shafts, a plurality of combustion chambers, one associated with each pair of cylinders, a piston in each cylinder, which pistons of each pair are connected respectively to the two driving shafts, the cylinders of each of which pairs are so inclined that their outer ends are close together and so that their axes cut respectively the axes of the driving shafts, two epicyclic gears each comprising planet-wheels which engage both a gear-wheel on a driving shaft and a reaction gear-wheel and each comprising a planet-wheel carrier, which planet-wheel carriers are gear-connected together and which gearing as a whole is so arranged that the driving shafts rotate the same number of revolutions per minute in opposite directions, a crank arm attached to each reaction gear-wheel, a link pivotally connecting together the two crank arms, the length and angular disposition of which crank arms and link are so selected that upon movement of the link the mechanical advantages of the crank arms on the link vary in a manner to balance the changing difference between the torque reactions transmitted by the reaction gear-wheels.

13. A variable-compression internal-combustion engine comprising a plurality of pairs of cylinders of equal diameter, the cylinders in each pair being arranged end-to-end, a combustion chamber formed between the cylinders of each pair and communicating with both of them, two driving shafts arranged at opposite ends of the pairs of cylinders, a piston in each cylinder, which pistons of each pair are connected respectively to the two driving shafts, two epicyclic gears each comprising planet-wheels which engage both a gear-wheel on a driving shaft and a reaction gear-wheel and each comprising a planet-wheel carrier, which planet-wheel carriers are gear-connected together and which gearing as a whole is so arranged that the driving shafts rotate the same number of revolutions per minute in opposite directions, a crank arm attached to each reaction gear-wheel, a link pivotally connecting together the two crank arms, the length and angular disposition of which crank arms and link are so selected that upon movement of the link the mechanical advantages of the crank arms on the link vary in a manner to balance the changing difference between the torque reactions transmitted by the reaction gear-wheels.

14. A variable-compression internal-combustion engine for aircraft comprising two driving-shafts, a plurality of working chambers each having two cylinder portions of equal diameter communicating with one another through a combustion space, a piston in each cylinder portion, which pistons are connected respectively to the two driving-shafts, gearing arranged so to connect together said driving-shafts that they rotate the same number of revolutions per minute and means adapted to adjust the angular relationship of the two driving-shafts in respect to one another during the running of the engine, a supercharger in permanent operative association with the induction system of the engine, means responsive to changes of pressure in said engine for operating the means for varying the compression ratio so as to increase the compression ratio with decrease of engine pressure and to decrease the ratio upon increase of engine pressure.

15. A variable-compression internal-combustion engine for aircraft comprising two driving-shafts, a plurality of working chambers each having two cylinder portions of equal diameter communicating with one another through a combustion space, a piston in each cylinder portion, which pistons are connected respectively to the two driving-shafts, gearing arranged so to connect together said driving-shafts that they rotate the same number of revolutions per minute and means adapted to adjust the angular relationship of the two driving-shafts in respect to one another during the running of the engine, a supercharger in permanent operative association with the induction system of the engine, means responsive to changes of absolute pressure in said induction system for operating the means for varying the compression ratio so as to increase the compression ratio with decrease of absolute pressure and to decrease the ratio upon increase of absolute pressure.

16. A variable-compression internal-combustion engine for aircraft comprising two driving-shafts, a plurality of working chambers each having two cylinder portions of equal diameter communicating with one another through a combustion space, a piston in each cylinder portion, which pistons are connected respectively to the two driving-shafts, gearing arranged so to connect together said driving-shafts that they rotate the same number of revolutions per minute and means adapted to adjust the angular relationship of the two driving-shafts in respect to one another during the running of the engine, a supercharger in permanent operative association with the induction system of the engine, means responsive to changes of maximum pressure in the engine cylinders for operating the means for varying the compression ratio so as to increase the compression ratio with decrease in pressure and to decrease the ratio upon increase of pressure.

17. A variable-compression internal-combustion engine for aircraft comprising two driving-shafts, a plurality of working chambers each having two cylinder portions of equal diameter communicating with one another through a combustion space, a piston in each cylinder portion, which pistons are connected respectively to the two driving-shafts, gearing arranged so to connect together said driving-shafts that they rotate the same number of revolutions per minute and means adapted to adjust the angular relationship of the two driving-shafts in respect to one another during the running of the engine, a servo-motor operating said means, means responsive to changes of pressure in said engine for controlling said servo-motor so that the compression ratio is decreased upon increase of engine pressure and increased upon decrease of pressure and a supercharger in permanent operative association with the induction system.

18. A variable-compression internal-combustion engine for aircraft comprising two driving-shafts, a plurality of working chambers each having two cylinder portions of equal diameter communicating with one another through a combustion space, a piston in each cylinder portion, which pistons are connected respectively to the two driving-shafts, gearing arranged so to connect together said driving-shafts that they rotate the same number of revolutions per minute and means adapted to adjust the angular relationship of the two driving-shafts in respect to one another during the running of the engine, a servo-motor energized by an oil-pressure system of the engine for operating said means, means responsive to changes of pressure in said engine for controlling said servo-motor so that the compression ratio is decreased upon increase of engine pressure and increased upon decrease of pressure and a supercharger in permanent operation associated with the induction system.

19. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, adjustable gearing so arranged between said driving shafts that they rotate the same number of revolutions per minute and comprising an adjusting member the movement of which varies the angular relationship of said shafts in respect to one another, which adjusting member is arranged that the torque reactions transmitted to it by the driving shafts are in opposite directions and adjustable means arranged to balance the difference between the torque reactions on said member (which difference varies with different angular relationships of said shafts), a servo-motor connected to the adjusting member, means responsive to changes of pressure in said engine for controlling said servo-motor so that the compression ratio is decreased upon increase of engine pressure and increased upon decrease of pressure and a supercharger in permanent operative association with the induction system.

20. A variable-compression internal-combustion engine comprising two driving shafts, a plurality of working chambers each having two cylinder portions of equal diameter communicating with one another through a combustion space, a piston in each cylinder portion, which pistons are connected respectively to the two driving shafts, adjustable gearing so arranged between said driving shafts, that they rotate the same number of revolutions per minute and comprising an adjusting member the movement of which varies the angular relationship of said shafts in respect to one another, which adjusting member is arranged that the torque reactions transmitted to it by the driving shafts are in opposite directions and adjustable means arranged to balance the difference between the torque reactions on said member (which difference varies with different angular relationships of said shafts), a servo-motor operating said means, which servo-motor is controlled by a mixture control of the engine carburetter and by means responsive to changes of pressure in said motor, whereby the compression ratio is decreased upon increase of engine pressure and increased upon decrease of pressure and a supercharger in permanent operative association with the induction system.

21. A variable-compression internal-combustion engine comprising two driving-shafts, a plurality of working chambers each having two cylinder portions of equal diameter communicating with one another through a combustion space, a piston in each cylinder portion, which pistons are connected respectively to the two driving-shafts, gearing adapted to drive said shafts at the same speed and to drive valve mechanism and means adapted so to adjust the angular relationship of the two driving-shafts that one is advanced in relation to the valve mechanism, and the other is retarded to the same extent.

22. A variable-compression internal-combustion engine comprising two driving-shafts, a plurality of working chambers each having two cylinder portions of equal diameter communicating with one another through a combustion space, a piston in each cylinder portion, which pistons are connected respectively to the two driving-shafts, two epicyclic gears each comprising planet-wheels which engage both a gear-wheel on the driving-shaft and a reaction gear-wheel and each comprising a planet-wheel carrier, which planet-wheel carriers are gear-connected together and to valve-driving mechanism and an adjusting member interconnected with the reaction gear-wheels so that both reaction gear-wheels may be adjustably rotated and thereby alter the angular relationship of the driving-shafts without alteration of the timing of the valve mechanism.

23. A variable-compression compression-ignition engine comprising two driving-shafts, a plurality of pairs of cylinders of equal diameter, the cylinders in each pair being arranged end-to-end, a combustion chamber formed between the cylinders of each pair and communicating with both cylinders, a sleeve-valve associated with each cylinder, a piston in each cylinder, which pistons of each pair are connected respectively to the two driving-shafts, gearing arranged so to connect together said driving-shafts that they rotate the same number of revolutions per minute, means for adjusting the angular relationship of the two driving-shafts in respect to one another during the running of the engine, a fuel-pump adapted to inject fuel into the compressed charge in the combustion chamber, which fuel-pump and valve sleeves are driven by gearing from said crank-shafts.

WILLIAM HELMORE.
ALAN ARNOLD GRIFFITH.